United States Patent
Laganière

(10) Patent No.: US 7,766,158 B2
(45) Date of Patent: Aug. 3, 2010

(54) EXTENDABLE CONVEYOR SYSTEM

(76) Inventor: Pierre Laganière, 329, rue des Artisans, St-Augustin-de-Desmaures, (Québec) (CA) G3A 1K3

(*) Notice: Subject to any disclaimer, the term of this patent is extended or adjusted under 35 U.S.C. 154(b) by 178 days.

(21) Appl. No.: 11/744,416

(22) Filed: May 4, 2007

(65) Prior Publication Data
US 2008/0283364 A1 Nov. 20, 2008

(30) Foreign Application Priority Data
Oct. 11, 2006 (CA) .................. 2563645

(51) Int. Cl.
*B65G 21/14* (2006.01)
*B65G 15/26* (2006.01)

(52) U.S. Cl. .............. 198/812; 198/588; 198/594; 198/312

(58) Field of Classification Search ............. 198/812, 198/588, 586, 594, 602, 581, 312–315, 574, 198/300, 364
See application file for complete search history.

(56) References Cited

U.S. PATENT DOCUMENTS

| | | | | |
|---|---|---|---|---|
| 285,339 | A * | 9/1883 | Anderson | 198/594 |
| 654,193 | A * | 7/1900 | Torbeck | 198/594 |
| 1,343,799 | A * | 6/1920 | Trefren | 198/812 |
| 3,530,973 | A * | 9/1970 | Rossi | 198/575 |
| 3,945,484 | A * | 3/1976 | Oury | 198/313 |
| 4,119,193 | A * | 10/1978 | Smith et al. | 198/371.2 |
| 4,168,776 | A * | 9/1979 | Hoeboer | 198/797 |
| 4,429,517 | A | 2/1984 | Lohrentz | |
| 4,938,010 | A | 7/1990 | Guinn | |
| 5,307,917 | A * | 5/1994 | Hall | 198/313 |
| 5,324,158 | A * | 6/1994 | Shah et al. | 414/294 |
| 6,401,440 | B1 | 6/2002 | Franet | |
| 6,508,050 | B1 | 1/2003 | Krone | |
| 6,758,321 | B2 * | 7/2004 | Spettl | 198/347.1 |
| 6,862,873 | B2 | 3/2005 | Franet | |
| 6,913,135 | B2 * | 7/2005 | Borderi et al. | 198/460.2 |
| 7,028,459 | B2 | 4/2006 | Lohrentz | |
| 7,093,709 | B2 | 8/2006 | Cotter | |
| 7,168,555 | B2 * | 1/2007 | Peterson | 198/812 |
| 2005/0120696 | A1 | 6/2005 | Lohrentz | |
| 2005/0183932 | A1 * | 8/2005 | Angleitner | 198/618 |

FOREIGN PATENT DOCUMENTS

EP 1172311 A2 * 1/2002
FR 2865104 7/2005

* cited by examiner

*Primary Examiner*—Gene Crawford
*Assistant Examiner*—William R Harp
(74) *Attorney, Agent, or Firm*—Robert Brouillette; Brouillette & Partners

(57) ABSTRACT

An extendable belt conveyor system designed to be installed under a self-propelled windrower between the front and the rear wheels suitable for multiple windrowing operations. The self-propelled windrower with the extendable belt conveyor system deliver a swath at a variable distance from the windrower, either on left or on the right, as the machine moves through the field. The conveyor can be directed on the left or on the right at variable distances with no need to manually change a part. The extendable belt conveyor system has at least two conveyors disposed one above the others and are connected with a trolley between each conveyor. The extendable belt conveyor system is driven by a single driving means and by a single reversible motor.

6 Claims, 6 Drawing Sheets

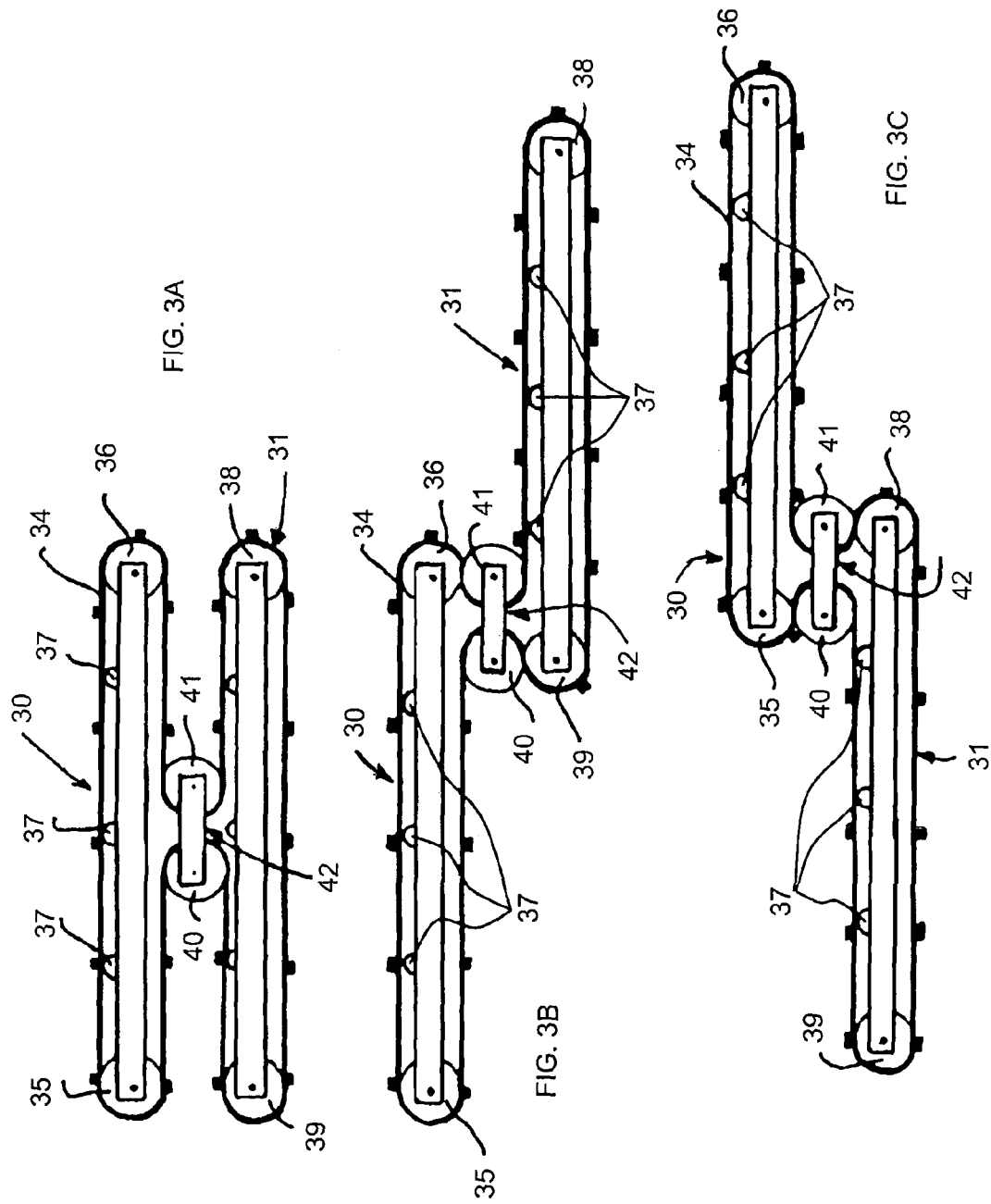

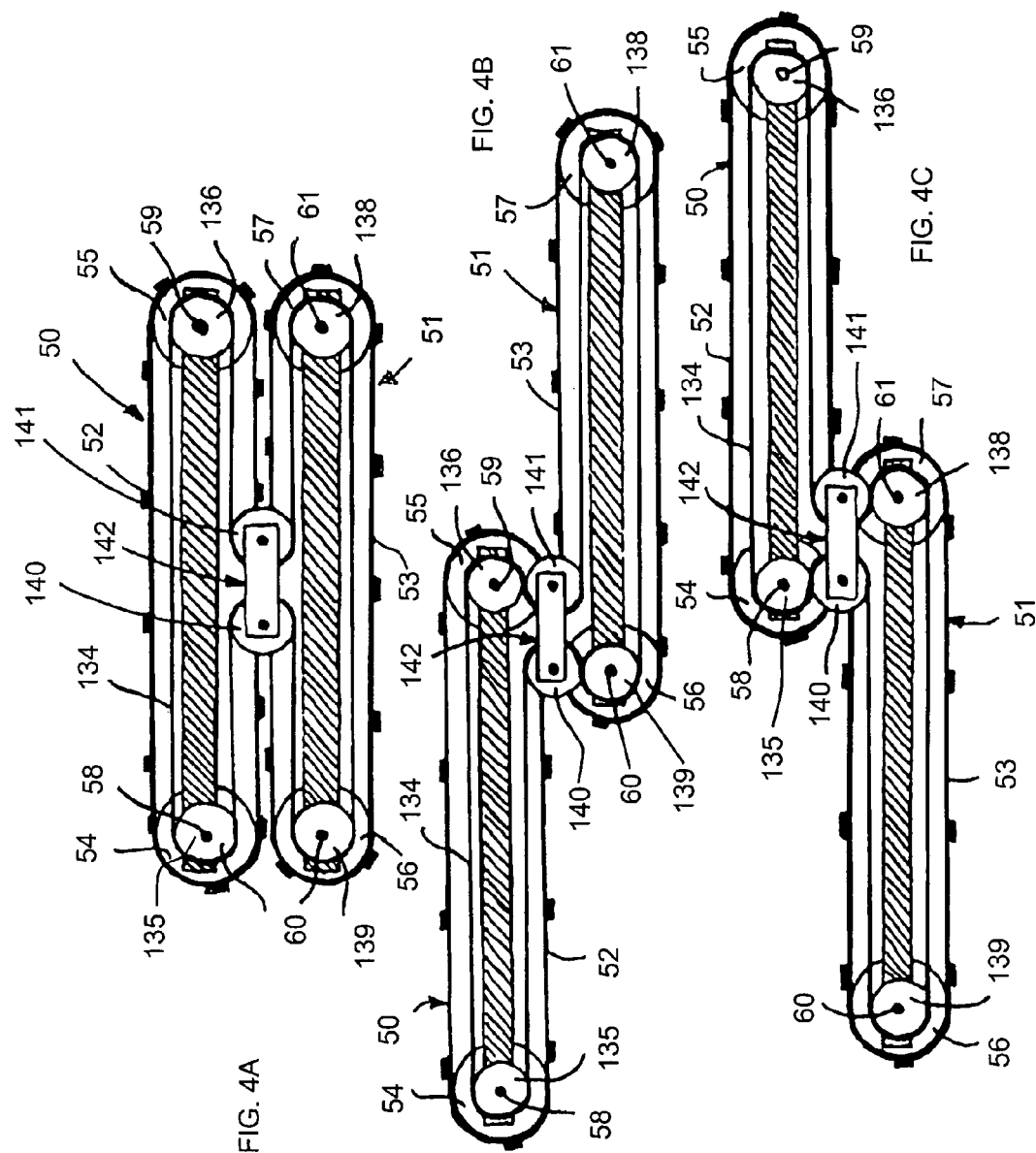

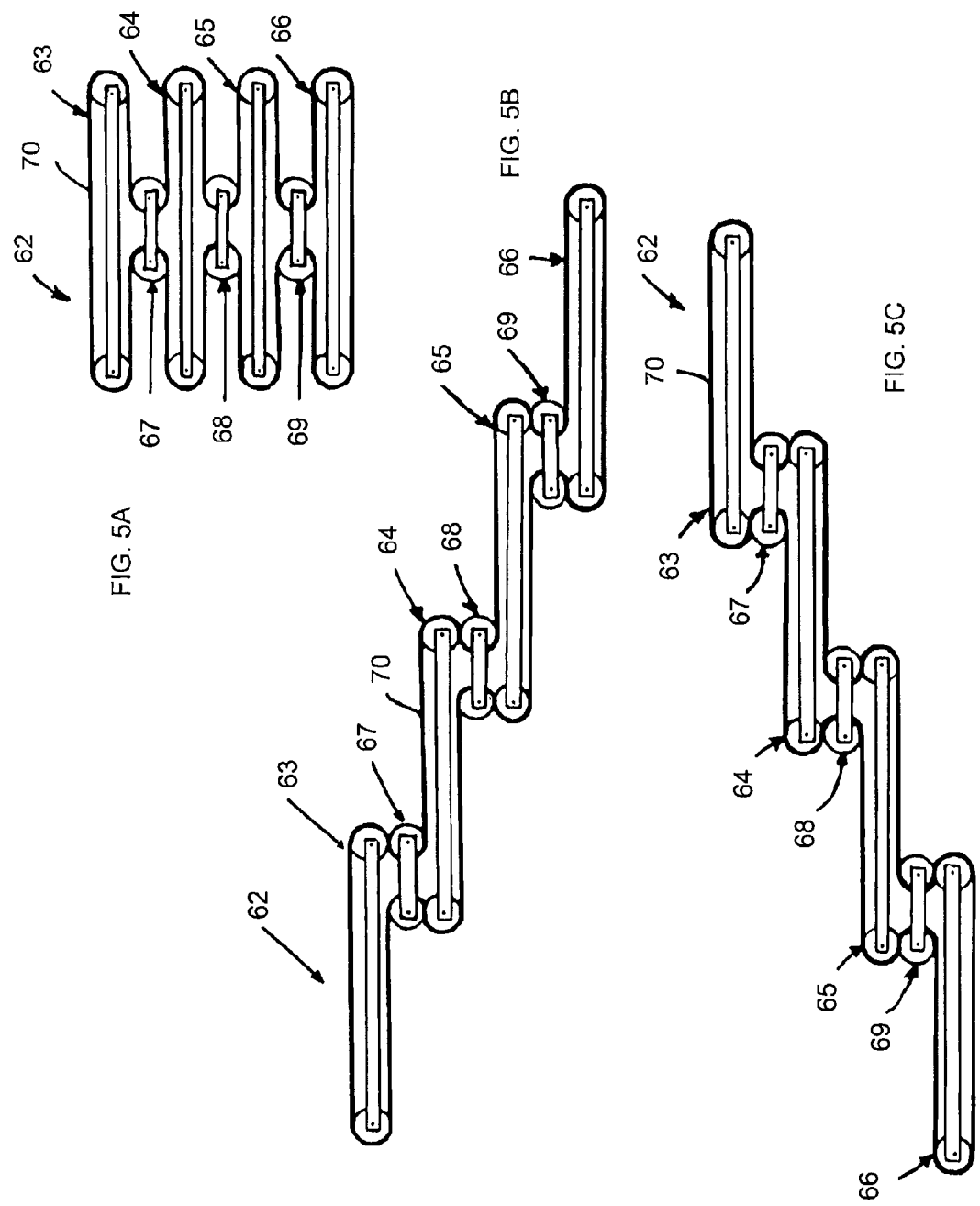

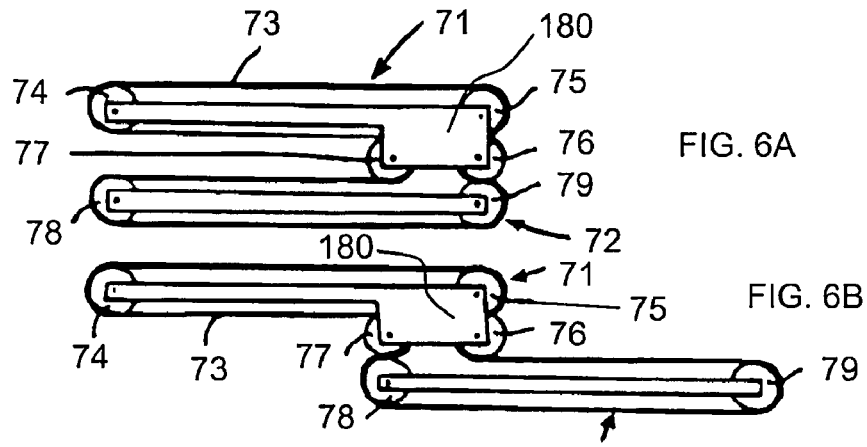
FIG. 6A
FIG. 6B
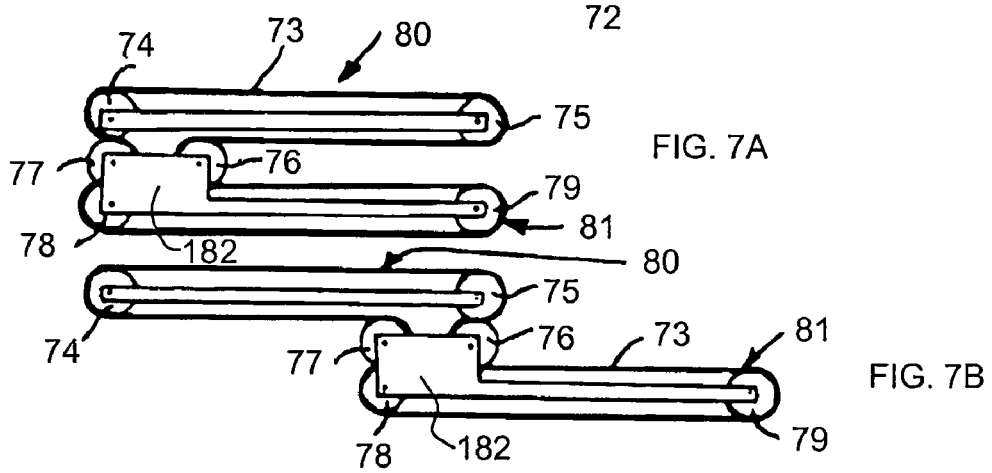
FIG. 7A
FIG. 7B
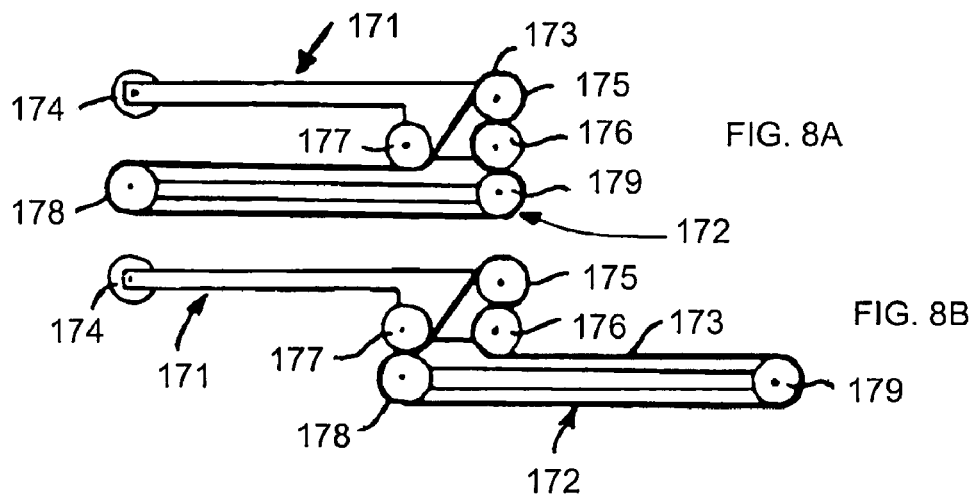
FIG. 8A
FIG. 8B

EXTENDABLE CONVEYOR SYSTEM

CROSS-REFERENCE TO RELATED APPLICATIONS

There are no cross-related applications.

FIELD OF THE INVENTION

The present invention is particularly suited to be used in a windrower and, more particularly, to windrower equipment of the type that is capable of producing multiple adjacent swaths to make the most efficient use of the high capacity available in large equipment to collect severed crop materials.

BACKGROUND OF THE INVENTION

High capacity machines such as a big square baler or a forage harvester have a very high capacity to ingest a large amount of severed crop materials during each pass through the field. However, most existing harvesting machines are not able to create enough quantity of severed crop materials to use the maximal capacity of big square balers or forage harvesters. The problem underlying with this small quantity is that too many operating steps are required to collect the severed crop materials.

Thus, multiple adjacent swaths lead to a higher efficiency when collecting the severed crop materials. However, in the case where the ground is inclined or in mountainous environment, the harvesting has to be made in only one direction. The methods developed at this time to make multiple adjacent swaths imply that each pass are made in opposite directions and this is not convenient for the ground types mentioned above.

Furthermore, in prior art equipment, each conveyor needs to have its own reversible motor, thus increasing the cost and time for the equipment and its maintenance.

There is therefore a need for a self-propelled harvester that improves the efficiency of the collection of severed crop materials, and which is usable for fields located in mountainous environment or inclined ground.

OBJECTS OF THE INVENTION

One important object of the present invention is to provide a windrowing machine in which multiple (preferably quadruple) adjacent swaths can be formed by the same windrower.

Another object of the present invention is to provide a conveyor capable of delivery on both sides.

A further object of the present invention is to provide delivery at a variable distance from the vehicle.

A still further object of the present invention is to provide an extendable belt conveyor system driven by a single driving means.

Another object of the present invention is to provide an extendable belt conveyor system driven by a single motor.

Other and further objects and advantages of the present invention will be obvious upon an understanding of the illustrative embodiments about to be described or will be indicated in the appended claims, and various advantages not referred to herein will occur to one skilled in the art upon employment of the invention in practice.

SUMMARY OF THE INVENTION

The present invention provides an extendable system conveyor that is particularly useful when used for side delivery of severed crop materials at different distances. However, this conveyor can be used in other applications other than the harvesting field, where a conveyor is needed with similar characteristics. The invention will be described when it is used with a self-propelled windrower and as a free standing conveyor.

According to one aspect of the present invention there is provided a self-propelled windrower having an extendable belt conveyor system that is capable of moving to either side of the windrower, and being extended at variable lengths. The severed crop materials can therefore be sent on either side of the vehicle by using a reversible motor. Because the extendable belt conveyor system is using only one driving means for all the conveyor elements, the rotation of all the conveyors is changed by reversing the motor rotation. This can be of a particular interest for fields located in mountains or on inclined ground because the passes can be made only in one direction for the stability of the vehicle. So there is no need to change the equipment to send the severed crop materials on other side of the vehicle. The driving means may be a driving belt or a driving chain. It is to be noted that the conveying belt transporting the material could also act both as a conveying belt and as a driving belt.

The procedure explained above is for a field on an inclined ground where the vehicle can be driven in only one direction but it should be understood that the procedure can be made with passes done alternatively in opposite directions. During a first pass in the procedure, the operator positions the machine at a distance inwardly from the uncut edge of the standing crop materials, such distance preferably being approximately the same or slightly less than the width of cut normally taken by the header. As the first pass is made, the conveyor is maintained in a position so that severed crop materials is issued on the right of the vehicle without passing over the border created on the right. This produces a first deposit of severed crop materials and creates the first swath.

The second pass is then made in the same direction on the left side of the first pass. Thus, as the second pass is carried out, the severed crop materials are sent on the right of the vehicle by the conveyor, now further extended to the right. This second swath is disposed at the left of the first swath or over it.

The third pass is made on the left side of the first swath, the left side of the header following the right border of the first swath. The severed crop materials are now sent to the left side of the vehicle, on the right of the first swath or over it.

Finally, the fourth swath is made at the right of the third swath, the left side of the header following the right border of the third swath. The severed crop materials are then sent to the left side of the vehicle, on the right of the third swath or over it. The conveyor is more extended than for the third pass to deliver the severed crop materials farther on the left. With these four passes, a larger swath has been created by the accumulation of four swaths and this larger swath can be ingested by equipment such as a big square baler in only one pass.

In the present invention, the severed crop materials can be delivered at variable length on both side of the self-propelled windrower with the extendable belt conveyor system fixed under the vehicle with only one reversible motor. This is possible with the use of a single driving means to drive all the conveyors.

In one form of the invention, an extendable belt conveyor system is composed by two belt conveyors driven by a single means, an upper conveyor and a lower conveyor. Both conveyors are connected by a single driving means passing into a trolley located between these two conveyors.

The trolley has two functions in the extendable belt conveyor system, first it acts as a tensioning system to keep the tension in the belt with tensioning means, and secondly it allows the relative movement of the conveyors to each other. The trolley has two idler rollers, which can be adjusted to control the tension of the belt. Furthermore, while the extendable belt conveyor system is extending, the idler rollers allows the displacement of a conveyor relatively to its adjacent conveyor.

The trolley can move freely between the idler rollers of the upper conveyor in a parallel way. However, the trolley cannot go farther on the left or on the right than the extremity or the upper conveyor. The movement of the trolley allows the lower conveyor to extend on the both sides or extremities of the lower conveyor. More than two conveyors can be installed, with a trolley between consecutive conveyor, if needed, following the same principles.

In another form of the invention, still with two conveyors one above the other, the driving means is still the same for the upper and the lower conveyor but each conveyor has its own conveyor belt to transport the material. As the precedent embodiment, a trolley between the conveyors allows the assembly to extend laterally on both sides of the upper conveyor. The torque required to operate the conveyor is provided to the sprocket wheels at the extremities of the idler rollers by the driving means (which can be a chain, an endless belt or any other suitable device). With this configuration, an engaging device (clutch) can be used to activate the second conveyor only when needed.

The trolley between the conveyors may be fixedly attached to one of the conveyors if the extension is needed on only one side. The extension is made on the side (right or left) were the trolley is fixed, the belt passing through both conveyors.

Even with a fixed trolley between the conveyors, two independents belts can be used to carry the material and the driving means is connected to sprocket wheels at the extremities of the idler rollers of the conveyors, still using only one driving means.

The features of the present invention which are believed to be novel are set forth with particularity in the appended claims.

BRIEF DESCRIPTION OF THE DRAWINGS

FIGS. 3a, 3b and 3c are side views of a first embodiment of the invention having a single belt acting as a conveyor belt and as a drive belt, FIG. 3a showing a central position, 3b a right side extension and 3c a left side extension.

FIGS. 4a, 4b and 4c are side views of a second embodiment of the invention having two independent conveyor belts and a single driving means, FIG. 4a showing a central position, 4b a right side extension and 4c a left side extension.

FIGS. 5a, 5b, 5c are side views of a third embodiment of the invention, having a four conveyor assembly, FIG. 5a showing a central position, 5b a right side extension and 5c a left side extension.

FIGS. 6a and 6b are side views of another embodiment of the invention, with a fixed trolley on the upper conveyor, FIG. 6a showing a central position and 6b the right side extension.

FIGS. 7a and 7b are side views of another embodiment of the invention, with a fixed trolley on the left of the lower conveyor, FIG. 7a showing a central position and 7b the right side extension.

FIGS. 8a and 8b are side views of another embodiment of the invention, wherein the lower conveyor is driven with the driving means of the upper conveyor through a fixed trolley, FIG. 8a showing a central position and 8b the right side extension.

DETAILED DESCRIPTION OF THE PREFERRED EMBODIMENT

Figure 1A:
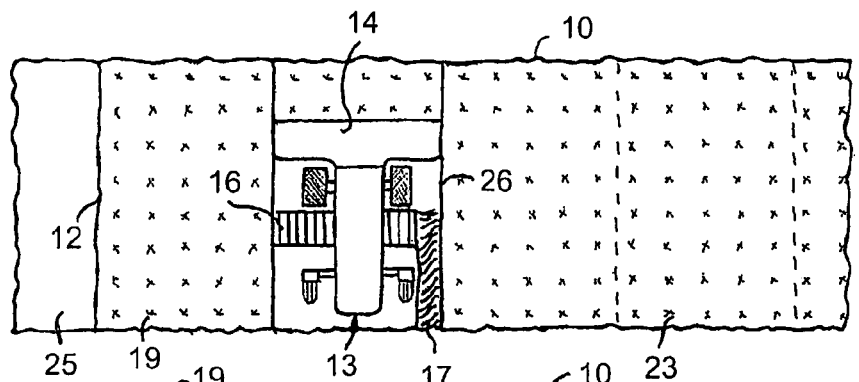
FIGS. 1a, 1b, 1c and 1d are schematic top plan views illustrating a quadruple windrowing method in accordance with the principles of the present invention.

The present invention is susceptible of embodiment in many different forms, some possible embodiments are presented.

FIGS. 1a, 1b, 1c and 1d illustrate a procedure to group four swaths 17, 20, 22, 24 together with the extendable belt conveyor system 16 attached to a self-propelled windrower 13. The self-propelled windrower 13 comprises a self-propelled vehicle 15, a header 14 attached to the front of the self-propelled vehicle 15 and an extendable belt conveyor system 16 for the side delivery of the swaths.

In FIG. 1a, the self-propelled windrower 13 is shown doing the first of the four passes in a field 10 of standing crop materials. The field 10 is delimited by the border 12 which separate the cut part 25 and the uncut part. For the first pass, the operator positions the windrower 13 essentially one header width inwardly from border 12 thus the distance between the border 12 and the left extremity of the header 14 is no greater than the cutting width of header 14. The conveyor 16, which is transversally fixed under the windrower 13, will send the severed crop materials on the right side of the windrower 13 as the latter is moving forwardly. The first swath 17 is then delivered on the left side of the border 26 and a band 19 of standing crop materials is created at the left of the self-propelled windrower 13.

Figure 1B:
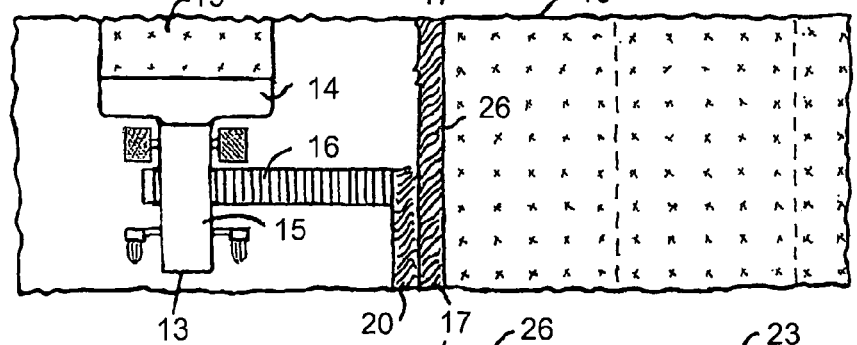

In FIG. 1b, the second pass is shown where the self-propelled windrower 13 passes over the uncut band 19 and delivers the severed crop materials into a second swath 20 on the left side of the first swath 17. The severed crop materials are delivered with the conveyor 16, which is extended to the right side of the windrower 13 to create the second swath 20 over the swath 17 or on the left border of the first swath 17 without passing over the first swath 17.

Figure 1C:
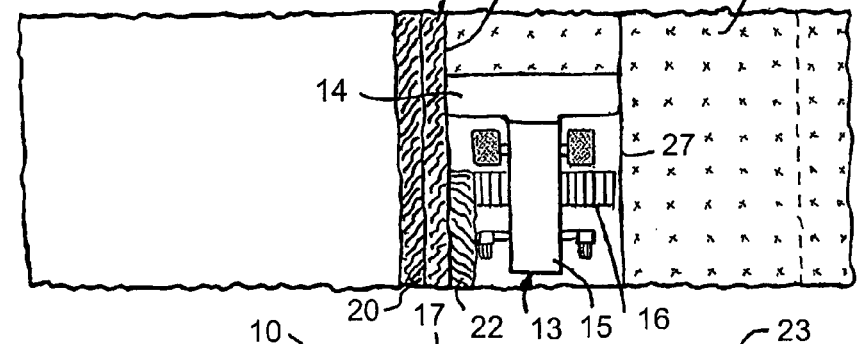

The third pass is shown in FIG. 1c, where the operator positions the self-propelled windrower 13 on the right border 26 of the first swath 17. The header 14 is thus following this border 26 to cut the standing crop materials on the right side of the swath 17 and to create a third swath 22 and a border 27. The conveyor 16 is now extended on the left side of the windrower 13 to deliver the severed crop materials over the swath 17 (not shown) or on the right border 26 of the first swath 17.

Figure 1D:
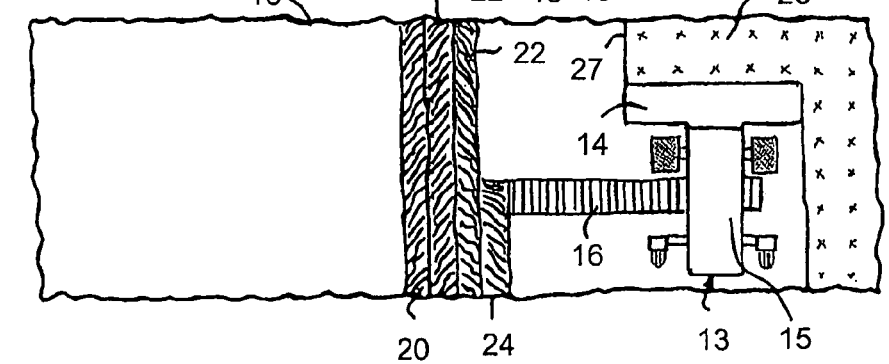

The fourth pass is shown in FIG. 1d, the windrower being positioned to cut the uncut part 23. The left side of the header 14 follows the border 27 and the conveyor 16 is extended on the left side of the windrower 13 to deliver the severed crop materials over the third swath 22 (not shown) or on the right side of the third swath 22. After the fourth pass has been done, a swath composed with the swaths 17, 20, 22 and 24 has been created.

Figure 2:
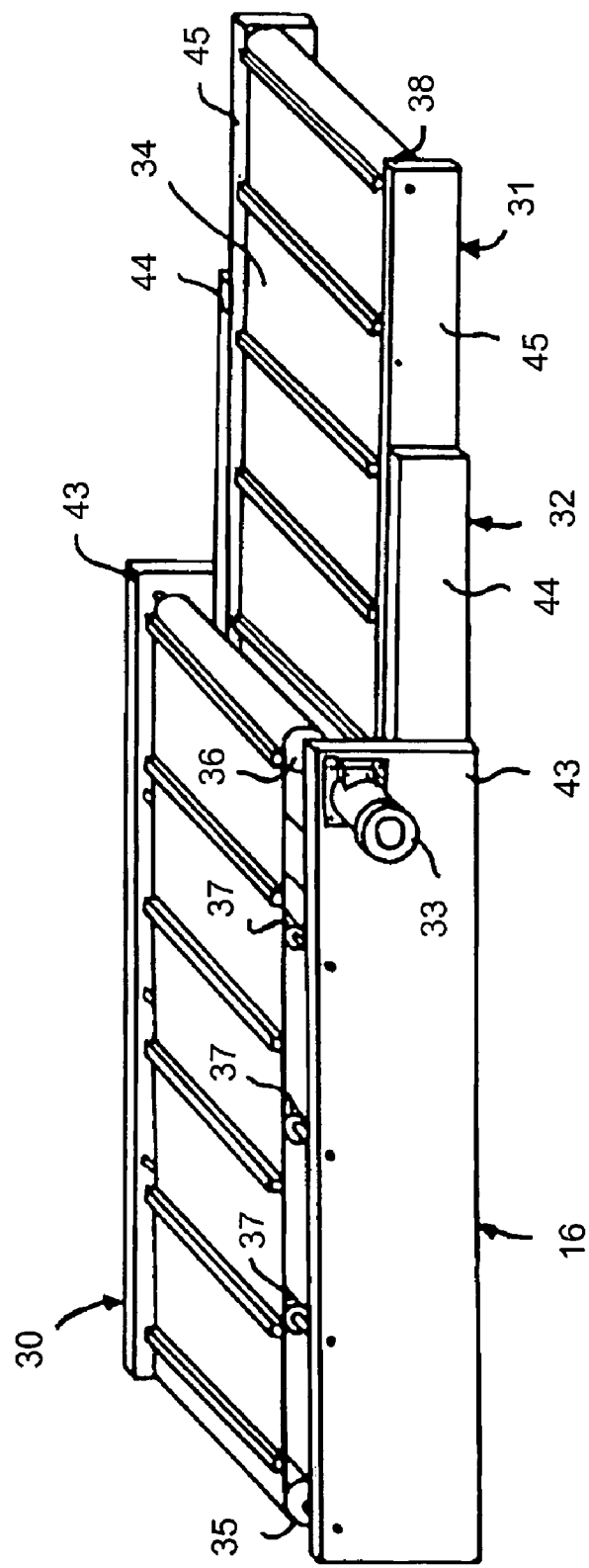
FIG. 2 is a perspective view of an embodiment of the extendable belt conveyor system being extended to the right.

The extendable conveyor 16 is shown in FIGS. 2 and 3a, b, c. It comprises two conveyors, the upper conveyor 30 and the lower conveyor 31. Both conveyors are driven by the same belt 34 operated by a reversible motor 33. There is also a trolley 42 connecting both conveyors 30 and 31 with the belt, composed by two belt idlers rollers 40 and 41. In this case, the belt 34 acts as conveying belt and as a driving means.

Still in FIG. 2, the sides 43 of the upper conveyor 30 act as a support for the slides 44 of the conveyor support 32 of the lower conveyor 31. The sides 45 of the lower conveyor 31 also act as slides with the sides 44 and 43 of the upper conveyor 30. The lower conveyor can be slide through the right side of the upper conveyor 30 (as seen in FIG. 3b) and through the left side of the upper conveyor 30 (as seen in FIG. 3c).

Now referring to FIG. 3, it can be seen that the lower conveyor 31 may extend from both extremities of the upper conveyor 30. The driving means 34 is moving between the tensioning idler rollers 35 and 36 and is supported by the support rollers 37. The same belt 34 pass under the idler roller 36 toward the idler roller 41 and then around the tensioning idler rollers 38 and 39. Finally, the belt 34 goes over the idler roller 39, passes by the idler roller 40 and return toward the idler roller 35.

The trolley 42 can move freely between the idler rollers 35 and 36 parallely to conveyors 30 and 31. However, the idler roller 40 cannot go farther on the left than the idler roller 35 (as seen in FIG. 3c) and the idler roller 39 (as seen in FIG. 3b) and, similarly, the idler roller 41 cannot go farther on the right than the idler roller 36 (as seen in FIG. 3b) and the idler roller 38 (as seen in FIG. 3c).

The FIGS. 4a, 4b and 4c are showing an embodiment where an assembly of two superposed conveyors 50 and 51 are driven by the same driving means 134 but having their own conveyor belts, respectively 52 and 53. The movement of the conveyor is induced with a driving means 134 (for example a chain or an endless belt) acting on sprocket wheels 135, 136, 138 and 139 fixed on the extremities of the axles 58, 59, 60 and 61 of the idler rollers 54, 55, 56 and 57. The driving means 134 is moving between the tensioning idler rollers 135 and 136. The driving means 134 passes under the idler roller 136 toward the idler roller 141 and then around the tensioning idler rollers 138 and 139. Finally, the driving means 134 goes over the idler roller 139, passes by the idler roller 140 and return toward the idler roller 135. The trolley 142 can move freely between the idler rollers 135 and 136 parallely to both conveyors.

A clutch can be used on the sprocket wheels 135 or 136 (not shown) to engage the lower conveyor 51 only when necessary.

The FIGS. 5a, 5b and 5c show a four level conveyor system 62 having a first conveyor 63, a second conveyor 64, a third conveyor 65 and a fourth conveyor 66 all driven by the same belt 70, acting both as a driving belt and as a conveying belt. They are separate with trolleys 67, 68 and 69, each conveyor interacting with the upper and/or lower conveyor via the trolleys.

The FIGS. 6a and 6b show two conveyors 71 and 72 driven by the same belt 73, acting both as a driving belt and as a conveying belt, with a fixed trolley 180 attached to the upper conveyor 71. With the fixed trolley 180 located on the right side, the conveyor 79 can be extended only on the right side. The belt 73 of the upper conveyor 71 is moving between the tensioning idler rollers 74 and 75. The same belt 73 passes under the idler roller 75 toward the idler roller 76 and then around the tensioning idler rollers 79 and 78. Finally, the belt 73 goes over the idler roller 78, passes by the idler roller 77 and return toward the idler roller 74.

FIG. 7a and 7b show two conveyors 80 and 81 driven by the same belt 73, acting both as a driving belt and as a conveying belt, with a fixed trolley 182 attached to the lower conveyor 81. With the fixed trolley 182 located on the left side, the conveyor 80 can be extended only on the left side. The belt 73 of the upper conveyor 71 is moving between the tensioning idler rollers 74 and 75. The same belt 73 passes under the idler roller 75 toward the idler roller 76 and then around the tensioning idler rollers 79 and 78. Finally, the belt 73 goes over the idler roller 78, passes by the idler roller 77 and return toward the idler roller 74.

In FIGS. 8a and 8b, the conveyor 171 and the conveyor 172 are driven by the belt 173. The belt 173 is connected to the idler rollers 175, 176, 177, 178 and 179 of the conveyor 171 which induce the movement. FIG. 8b shows the conveyor 172 completely extended to the right. The conveying belt (not shown) of the conveyor 171 would circulate between tensioning idler roller 173 and 174. The belt 173 convey the material falling onto the conveyor 172.

Although preferred embodiments of the invention have been described in detail herein and illustrated in the accompanying figures, it is to be understood that the invention is not limited to these precise embodiments and that various changes and modifications may be effected therein without departing from the scope or spirit of the present invention.

The invention claimed is:

1. An extendable belt conveyor system of the type having a conveying belt to convey material, said conveyor having a variable length and which is configured to extend on both of its longitudinal sides by using a reversible motor, and being extended to variable lengths to deliver conveyed material at different distances, said extendable conveyor system comprising:
   a. a first conveyor comprising a first idler roller and a second idler roller, wherein said first conveyor is free to move longitudinally;
   b. a second conveyor adjacent to said first conveyor, said second conveyor comprising a first idler roller and a second idler roller, wherein second conveyor is free to move longitudinally;
   c. an endless belt, said endless belt passing over said first idler roller and said second idler roller of said first conveyor and of said second conveyor; and
   d. a trolley comprising a third idler roller and a fourth idler roller, said trolley being located between said adjacent conveyors, wherein said endless belt passes between said third idler roller and said fourth idler roller of said trolley;
   wherein said length of said length of said extendable conveyor is modified by displacing longitudinally one or both of said first and said second conveyor, one either longitudinal sides of said first and second conveyor and wherein conveyed material is conveyed from one of said first or second conveyor to another one of said first or second conveyor on said endless belt.

2. The extendable belt conveyor system of claim 1, wherein said conveyors are driven using a single driving means.

3. The extendable belt conveyor system of claim 1, wherein said trolley is fixedly attached to said first or second conveyor.

4. The extendable belt conveyor system of claim 1, wherein said extendable conveyor system is driven by said conveying belt.

5. The extendable belt conveyor system of claim 1, further comprising a clutch to engage or disengage one of said conveyors.

6. The extendable belt conveyor system of claim 1, further comprising at least one further conveyor connected to said first conveyor or said second conveyor.

* * * * *